Jan. 1, 1963     G. A. LARRY     3,071,030
HOLE FORMING OR ENLARGING ASSEMBLY
Filed June 6, 1961
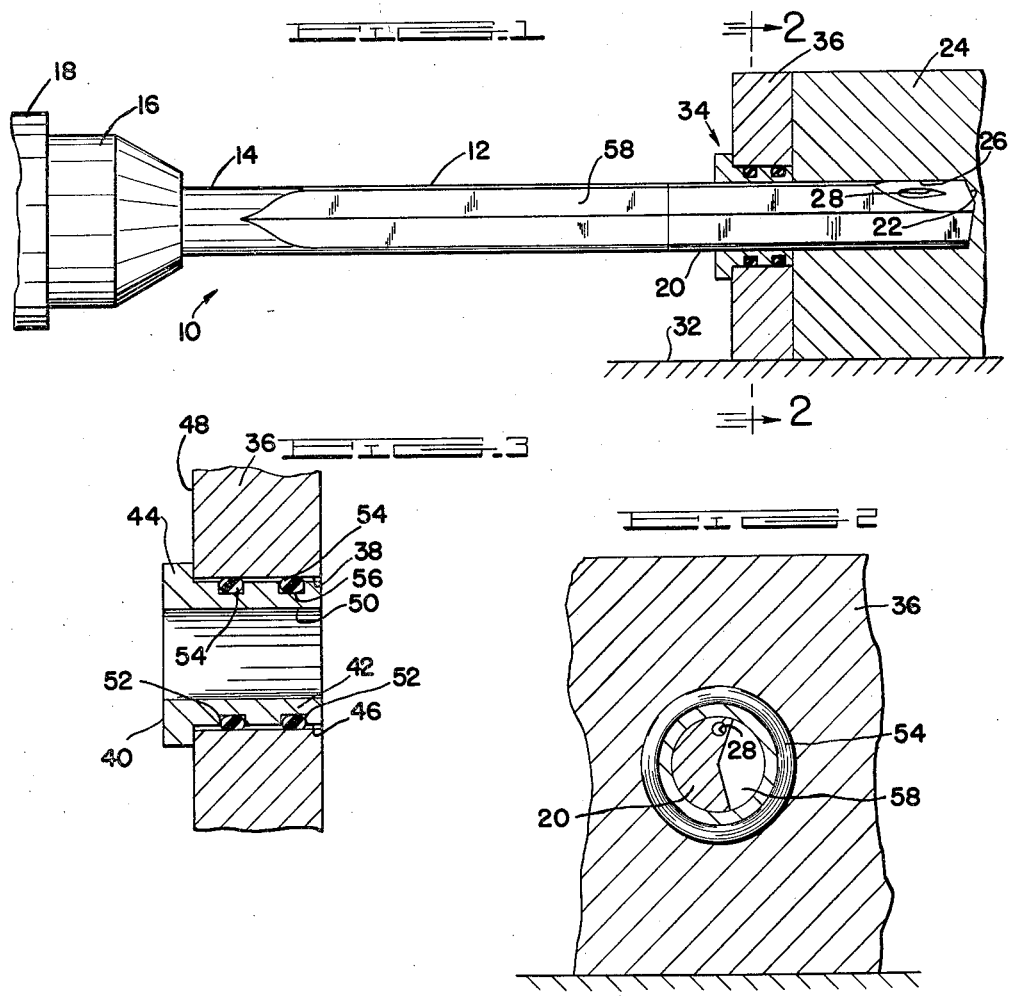
INVENTOR.
GEORGE A. LARRY
BY
OLSEN AND STEPHENSON
ATTORNEYS

United States Patent Office 3,071,030
Patented Jan. 1, 1963

3,071,030
HOLE FORMING OR ENLARGING ASSEMBLY
George A. Larry, Farmington, Mich., assignor to Star Cutter Company, Farmington, Mich., a corporation of Michigan
Filed June 6, 1961, Ser. No. 115,137
5 Claims. (Cl. 77—62)

This invention relates generally to hole forming or enlarging assemblies and more particularly to an improved assembly of this type which includes a tool guide bushing that is floatingly mounted to insure axial alignment of the bushing with the tool under substantially all conditions.

Hole forming or enlarging assemblies of the type to which this invention relates consist of an elongated rotatable tool capable of removing material from a workpiece, such as a drilling, reaming or boring tool which has a cutting tip and a shank that is supported in a rotatable spindle. The workpiece and the tool are moved relative to each other so that the tool is advanced in an axial direction to move the cutting tip into the workpiece. Since perfect alignment of the tool and the workpiece is essential, a guide bushing is mounted adjacent the workpiece to support the tip end of the tool. In some instances, the bushing also performs additional functions such as confining the flow of cooling and flushing fluid to the tool tip.

Difficulties have been encountered in maintaining the tools and the bushings in satisfactory condition over a prolonged service life. In some instances, the outer diameter surfaces of the tools have become prematurely worn sufficiently to cause undersize holes in the workpiece or the tools have become unevenly worn prematurely so that they do not operate as efficiently as desired. Also, the inner surfaces of the bushings have in some cases become scored and worn so that the bushings act either to exert undue wearing forces on the tool or they become oversize and do not accurately guide the tool. Difficulties have also been experienced in perfectly aligning the spindles and bushings thereby causing unnecessary wear on the tools and the bushings.

It is an object of this invention therefore to provide an improved hole forming or enlarging assembly which includes a tool guide bushing that is floatingly mounted so that it can shift to a position aligned with the spindle rotating the tool, and can also tilt slightly to accommodate slight bending or deflecting of the tool which may occur when the tool is initially engaged with the workpiece to thereby prevent undue wear of the bushing and the tip portion of the tool as a result of this deflecting.

A further object of this invention is to provide an assembly of the above type in which the bushing is mounted in an opening that is oversize relative to the outside diameter of the bushing, and O-rings are mounted on the bushing and engage the wall of the opening to both floatingly support the bushing in the opening and frictionally lock the bushing in the opening, thereby eliminating any requirement for additional locking structure.

Further objects, features and advantages of this invention will become apparent from a consideration of the following description, the appended claims, and the accompanying drawing in which:

FIGURE 1 is a fragmentary elevational view of the assembly of this invention, with some parts being broken away and other parts shown in section for the purpose of clarity;

FIGURE 2 is an enlarged transverse sectional view looking substantially along the line 2—2 in FIG. 1; and FIGURE 3 is a vertical sectional view of the tool guide bushing and the mounting plate therefor in the assembly of this invention.

With reference to the drawing, the hole forming or enlarging assembly of this invention, indicated generally at 10, is illustrated in FIG. 1 as including an elongated tool 12 having a hollow shank portion 14 mounted in a spindle 16 which forms a part of a machine 18 having driving means (not shown) for rotating the spindle 16. The tool 12 which may be any drilling, boring or reaming tool, is illustrated as including a cutting tip 20 secured to the shank 14 and formed of a hard wear resistant material such as metallic carbide. The tip 20 is formed at its working end with a cutting edge 22 which is engageable with a workpiece 24 so as to either form a hole 26 in the workpiece 24 or enlarge an existing hole in the workpiece 24 to the diameter of the hole 26 which is illustrated in FIG. 1. A discharge passage 28 for a fluid coolant is formed in the tip 20 so that it is directed toward the cutting edge 22 and communicates with the interior of the hollow shank portion 14. The illustrated tool 12 is described in detail in application, Serial No. 69,370 filed November 15, 1960 and owned by the assignee of this invention.

The tool 12 may be advanced axially relative to a fixed workpiece 24 or the tool 12 may be rotated and maintained in a fixed position and the workpiece 24 advanced toward the tool so that in any case the tool 12 and the workpiece 24 are moved relative to each other. In the illustrated embodiment of the invention, the workpiece 24 is illustrated as being maintained in a fixed position on a fixed surface 32. In order to guide the tool 12 into engagement with a predetermined point on the workpiece 24, a guide bushing assembly 34 is mounted on the surface 32 adjacent the workpiece 24. The assembly 34 includes a supporting plate or body 36 which, during advancement of the tool 12, is maintained in a fixed position adjacent the portion of the workpiece 24 in which the hole 26 is to be formed.

The support plate 36 is formed with an opening 38 which is positioned as nearly as possible in a location in axial alignment with the rotatable spindle 16 and the tool 12. A bushing 40 which consists of a tubular member 42 having a radial flange 44 at one end is positioned in the opening 38. The tubular member 42 is formed with a cylindrical external surface 46 which is of a diameter slightly less than the diameter of the opening 38 and the flange 44 is of a diameter greater than the diameter of the opening 38 so that when the cylindrical surface 46 is positioned within the opening 38, the flange 44 is engageable with one side 48 of the support plate 36. The tubular member 42 also has an opening 50 extending therethrough which is of a diameter only slightly greater than the diameter of the tool 12 sufficient to provide clearance between the tool 12 and the tubular member 42 during reciprocal or sliding movement of the tool 12 through the opening 50.

The cylindrical surface 46 is formed with a pair of grooves 52, illustrated as being of rectangular shape, and a pair of O-rings 54 are positioned in the grooves 52. The O-rings 54 are formed of a resilient material, such as rubber, which is yieldable under load but which has a high stiffness or hardness so that large loads are required in order to deform the O-rings 54 from their initial circular shape to the somewhat elliptical shape illustrated in FIG. 3. The O-rings 54 are of an internal diameter such that they engage the bottom walls 56 of the grooves 52 and they are of an external diameter such that they project radially outwardly of the surface 46. The outer diameter of the O-rings 54 is also greater than the diameter of the opening 38 in the support member 36. As a result, the O-rings 54 must be compressed from their circular shape to the somewhat elliptical shape illustrated in FIG. 3 in order to position the bushing 40 within the opening 38. The grooves 52 are of a width to accommodate the O-ring 54 when they are compressed as shown in FIG. 3 and in their compressed positions, the O-rings 54 exert high frictional forces on the wall of the opening 38. As a result, when the bushing 40 is inserted in the opening 38 to a position in which the flange 44 engages the side 48 of the plate 36, the O-rings 54 effectively lock the bushing 40 in the opening 38 so that a hammer or the like is required to remove the bushing 40. However, the O-rings 54 are sufficiently resilient to provide for shifting of the bushing 40 in the opening 38 to a position in which the axis of the bushing opening 50 is to one side of the axis of the opening 38 to insure an axial alignment of the bushing opening 50 with the spindle 16.

In the use of the assembly 10, the tool 12 is rotated and is advanced through the bushing 40 into engagement with the workpiece 24 so as to form the hole 26 of a desired diameter. During initial engagement of the cutting end of the tip 20 with the workpiece 24, the reaction force applied to the tool 12 in a direction axially of the tool toward the shank 14 by the workpiece 24 may cause a very slight bending or deflection of the portion of the tool 12 adjacent the workpiece 24. During such deflection or bending, the bushing 40 is tiltable on the O-rings 54 to accommodate this deflection of the tool 12 and insure alignment of the opening 50 with the portion of the tool 12 which is rotating therein. This tilting or inclining of the bushing 40 prevents misaligned contact of the bushing 40 and the tool 12 which contact creates undue and increased wear on both the bushing 40 and the tool 12. As a result, both the tool 12 and the bushing 40 may be used over a prolonged service life.

On completion of the forming of the opening 26, the tool 12 is retracted into the bushing 40, another workpiece 24 is positioned adjacent the bushing 40 and the tool 12 is again advanced to form a similar opening 26 in the second workpiece. As shown in FIG. 1, the bushing 40 is maintained in contact with the workpiece 24 to preclude any jamming of metal chips, which are removed from the workpiece 24 and flow rearwardly out of the opening 26 through a flute or external groove 58 in the tool 12, between the bushing 40 and the workpiece 24. The frictional forces exerted on the wall of the opening 38 by the O-rings 54 are sufficient to prevent withdrawal of the bushing 40 from the opening 38 during retraction of the tool 12 from the opening 26 into the bushing 40, thereby eliminating any requirement for additional locking structure to maintain the bushing 40 in its mounted position in the support plate opening 38.

It will be understood that the hole forming or enlarging assembly which is herein disclosed and described is presented for purposes of explanation and illustration and is not intended to indicate limits of the invention, the scope of which is defined by the following claims.

What is claimed is:

1. In an assembly for removing metal from a workpiece in which said assembly includes an elongated tool having a longitudinally extending axis, said tool and said workpiece being adapted for relative reciprocation along said axis to move said tool into said workpiece, and means for rotating said tool about said axis; a bushing assembly adapted to be positioned adjacent said workpiece in substantial alignment with said axis, said assembly including supporting means disposed adjacent said workpiece and provided with an opening of substantially constant diameter located in substantial alignment with said axis, a tubular member positioned axially in said opening and having an axial opening of a size to slidably support said tool, said tubular member having an external diameter of a size to provide for a loose support of said tubular member in said opening and having an annular groove in said external surface intermediate the ends of said tubular member, said groove having a bottom wall, and a continuous resilient ring member supported on said groove bottom wall and extending outwardly from said groove into engagement with the wall of said opening in the support means so as to provide for a floating support of the tubular member on the support means permitting inclination of the axis of the tubular member relative to the axis of the opening in which it is supported.

2. A bushing assembly comprising a tubular member having an axial opening extending therethrough and a cylindrical outer surface of substantially constant diameter, said tubular member having a radially outwardly extending flange at one end and a pair of axially spaced annular grooves formed in said outer surface at positions spaced from said flange, each of said grooves having a bottom wall and a pair of O-rings formed of a resilient compressible material and positioned in said grooves in engagement with said bottom walls thereof, each of said O-rings being of a size in cross section so that it projects radially outwardly of the groove therefor and is compressible radially inwardly in the direction of the groove bottom wall on which it is engaged.

3. A bushing assembly comprising a tubular member having an axial opening extending therethrough and a cylindrical outer surface, said tubular member having a pair of ends and a plurality of axially spaced annular grooves formed in said outer surface at positions between said ends, each of said grooves being of a substantially rectangular shape in cross section and having side walls and a bottom wall, and a plurality of O-rings formed of a resilient compressible material and positioned in said grooves, each of said O-rings being of a size in cross section so that it engages the bottom wall of the groove therefor and projects radially outwardly of said groove beyond said outer surface, and each of said O-rings being compressible in a direction radially inwardly thereof toward the bottom wall of the groove on which it is engaged.

4. In a hole forming or enlarging assembly, a tool having a shank portion at one end and a tip portion at the opposite end adapted to be engaged with a workpiece for forming or enlarging a hole therein, said tool having an axis about which it is adapted to be rotated, means engaged with said shank portion for rotating said tool about said axis, a bushing assembly positioned in a supporting relation with said tip portion, said assembly comprising a fixed support member having an opening therein, a tubular member having an opening therethrough of a size to slidably support said tip portion on reciprocation of said tool relative to said support, said tubular member having a radial flange on one end of a size larger than said support opening and a cylindrical outer surface of a diameter slightly less than the diameter of the opening in said support member, said external surface having a plurality of annular grooves formed therein and extending about said axial opening, each of said grooves having a bottom wall, and a plurality of resilient O-ring members disposed in said grooves in engagement with the bottom walls thereof and tightly engaged with the wall of said support opening for releasably locking said tubular member in said support opening in a position in which said flange is engaged with one side of said support member and so that said tubular member is mounted for limited shifting and tilting movement in said support opening.

5. In a hole forming or enlarging assembly, a tool having a shank portion at one end and a tip portion at the opposite end adapted to be engaged with a workpiece for forming or enlarging a hole therein, said tool having an axis about which it is adapted to be rotated, means engaged with said shank portion for rotating said tool about said axis, a bushing assembly positioned in a supporting relation with said tip portion, said assembly comprising a support member having an opening therein, a tubular member having an opening therethrough of a size to slidably support said tip portion on reciprocation of said tool relative to said support member, said tubular member having a cylindrical outer surface of a diameter slightly less than the diameter of the opening in said support member, said external surface having a plurality of annular grooves of a substantially rectangular shape formed therein and extending about said axial opening, each of said grooves having a bottom and side walls, and a plurality of rubber O-ring members disposed in said grooves in engagement with the bottom walls thereof, each of said O-rings being of an outer diameter greater than the diameter of said support member opening whereby on insertion of said tubular member into said support member opening said O-rings are compressed radially inwardly of said grooves and tightly engage the wall of said support member opening for releasably locking said tubular member in said support member opening in a position in which said tubular member is supported on said O-rings for limited shifting and tilting movement relative to said support opening.

References Cited in the file of this patent

UNITED STATES PATENTS 2,384,071    Boyer ------------------ Sept. 4, 1945

OTHER REFERENCES

"Details of Jigs and Fixtures," American Machinist Magazine: page 565, Oct. 13, 1927.